United States Patent
Takeuchi

(10) Patent No.: US 6,733,928 B2
(45) Date of Patent: *May 11, 2004

(54) AUTOCLAVABLE ELECTROCHEMICAL CELL

(75) Inventor: Esther S. Takeuchi, Williamsville, NY (US)

(73) Assignee: Wilson Greatbach, Ltd., Clarence, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/915,406

(22) Filed: Jul. 27, 2001

(65) Prior Publication Data

US 2002/0025476 A1 Feb. 28, 2002

Related U.S. Application Data

(63) Continuation of application No. 09/750,701, filed on Jan. 2, 2001, now abandoned, which is a continuation of application No. 09/551,830, filed on Apr. 18, 2000, now abandoned, which is a continuation of application No. 08/403,570, filed on Mar. 14, 1995, now Pat. No. 6,150,057, which is a continuation of application No. 08/273,604, filed on Jul. 12, 1994, now abandoned, which is a continuation of application No. 07/987,584, filed on Dec. 8, 1992, now abandoned, which is a continuation of application No. 07/767,855, filed on Sep. 30, 1991, now abandoned.

(51) Int. Cl.$^7$ .......................... H01M 10/40; H01M 4/48
(52) U.S. Cl. .................... 429/337; 429/218.1; 429/338; 429/340; 429/341
(58) Field of Search .............................. 429/120, 218.1, 429/231.5, 249, 254, 337, 338, 340, 341

(56) References Cited

U.S. PATENT DOCUMENTS

| | | |
|---|---|---|
| 3,393,092 A | 7/1968 | Shaw et al. |
| 3,544,385 A | 12/1970 | Newman |
| 4,060,674 A | 11/1977 | Klemann et al. |
| 4,201,838 A | 5/1980 | Goldberg |
| 4,228,226 A | 10/1980 | Christian et al. |
| 4,391,729 A | 7/1983 | Liang et al. |
| 4,751,157 A | 6/1988 | Uchiyama et al. |
| 4,762,758 A | 8/1988 | Shuster et al. |
| 5,114,811 A | 5/1992 | Ebel et al. |
| 5,130,211 A | 7/1992 | Wilkinson et al. |
| 5,139,901 A | 8/1992 | Kawaguchi et al. |
| 5,154,992 A | 10/1992 | Berberick et al. |
| 5,176,968 A | 1/1993 | Blasi et al. |
| 6,150,057 A | * 11/2000 | Takeuchi .................... 429/337 |

FOREIGN PATENT DOCUMENTS

| | | |
|---|---|---|
| EP | 0 044 240 | 1/1982 |
| EP | 0 169 407 | 1/1986 |
| EP | 0 189 891 | 8/1986 |
| EP | 0 441 589 | 8/1991 |

OTHER PUBLICATIONS

EP 92308936.1 European Search Report 12/1992.
Chemical Abstracts, vol. 112, No. 18, W. Thiebolt et al. "Autoclavable Lithium/Silver Vanadium Oxide Cell", p. 228, dated Apr. 30, 1990.

* cited by examiner

Primary Examiner—Stephen J. Kalafut
(74) Attorney, Agent, or Firm—Banner & Witcoff Ltd.

(57) ABSTRACT

An autoclavable elctrochemical cell which may be used in an implantable medical device. The anode active material is lithium or other material from groups IA and IIA of the Periodic Table and having a melting point greater than about 150 degrees C. The cathode active material is silver vanadium oxide or other metal oxide or carbon monoflouride. The solvent for the electrolyte has a boiling point greater than about 100 degrees C. and a dielectric constant greater than about 5 so that the cell may be dimensionally and chemically stable during repeated exposures of about one hour each to the autoclaving temperatures.

1 Claim, 1 Drawing Sheet

AUTOCLAVABLE ELECTROCHEMICAL CELL

This application is a continuation of Ser. No. 09/750,701 filed Jan. 2, 2001, now abandoned which is a continuation of Ser. No. 09/551,830 filed Apr. 18, 2000, now abandoned, which is a continuation of Ser. No. 08/403,570 filed Mar. 14, 1995, now U.S. Pat. No. 6,150,057, which is a continuation of Ser. No. 08/273,604 filed Jul. 12, 1994, now abandoned, which is a continuation of Ser. No. 07/987,584 filed Dec. 8, 1992, now abandoned, which is a continuation of Ser. No. 07/767,855 filed Sep. 30, 1991, now abandoned.

The present invention relates generally to the art of electrochemical cells and more particularly autoclavable electrochemical cells or batteries such as may be used, for example, in implantable medical devices.

Numerous power sources have been developed for use in implantable devices such as implantable drug pumps and pacemakers. It is important that the medical devices be sterilized prior to implantation in the body. Medical devices have been sterilized by treatment with an oxide gas such as ethylene oxide (filling oxide gas treatment). However, in addition to being considered environmentally unsafe, ethylene oxide gas is necrotic to tissue. During sterilization the ethylene oxide gas may become trapped in spaces within a medical device with the result that its eventual release, after implantation of the device, may lead to potentially severe tissue damage in the patient.

An alternative to ethylene oxide gas treatment is sterilization of the medical device in an autoclave. For such sterilization the implantable medical device and the electrochemical cell which serves as its power source must be capable of withstanding the repeated prolonged exposures to heat soak and other autoclaving conditions at the high temperatures on the order of 130 to 135 degrees C. encountered.

Batteries for implantable medical devices may include anodes having as active material lithium or other alkali metal, cathodes having as active material silver vanadium oxide or other metal oxide or carbon monoflouride, electrolytes composed of a lithium salt and an organic solvent, and a, separator material between the electrodes and which is porous for passage of the electrolyte therethrough for ionic transfer between the electrodes for generating a current. Examples of such batteries are disclosed in U.S. Pat. Nos. 4,057,679; 4,618,548; and 4,830,940. While batteries have been provided which have operating temperatures within the range of minus 55 to plus 225 degrees C., as discussed in related U.S. Pat. Nos. 4,310,609 and 4,391,729, which are assigned to the assignee of the present invention, the ability of a battery to operate in such a temperature range does not determine whether it has the ability to withstand the heat soak and other conditions of autoclaving at temperatures of about 130 to 135 degrees C.

Other patents which may be of interest include U.S. Pat. Nos. 4,751,157; 4,751,158; 4,146,685; 4,574,113; 4,615,959; 4,668,594; 4,668,595; and 4,735,875.

As discussed by the inventors of the present invention in an article entitled "Autoclavable Li/Silver Vanadium Oxide Cell", *Progress in Batteries & Solar Cells*, Volume 8 (1989), at pages 122–125, a desirable characteristic of some medical cells is the ability of the cells to withstand repeated high temperature excursions that occur during sterilization in an autoclave without loss of deliverable capacity.

Such batteries as disclosed in the aforesaid patents are deficient for purposes of autoclaving since their compositions are such that one or more of their components may render the cell dimensionally and/or chemically unstable during repeated exposures at autoclavable temperatures or cause a significant reduction in the cell's capacity as a consequence of such exposures.

It is accordingly an object of the present invention to provide an electrochemical cell which can withstand repeated exposure to autoclave environments without significant loss of capacity.

In order to provide such an autoclavable electrochemical cell, in accordance with the present invention the anode is provided to have as active material a material which has a melting point greater than about 150 degrees C. and the solvent for the electrolyte is characterized by having a boiling point greater than about 100 degrees C. and a dielectric constant greater than about 5.

The above and other objects, features, and advantages of the present invention will be apparent in the following detailed description of the preferred embodiments taken in conjunction with the accompanying drawings.

DETAILED DESCRIPTION OF THE PREFERRED EMBODIMENTS

Figure 1:
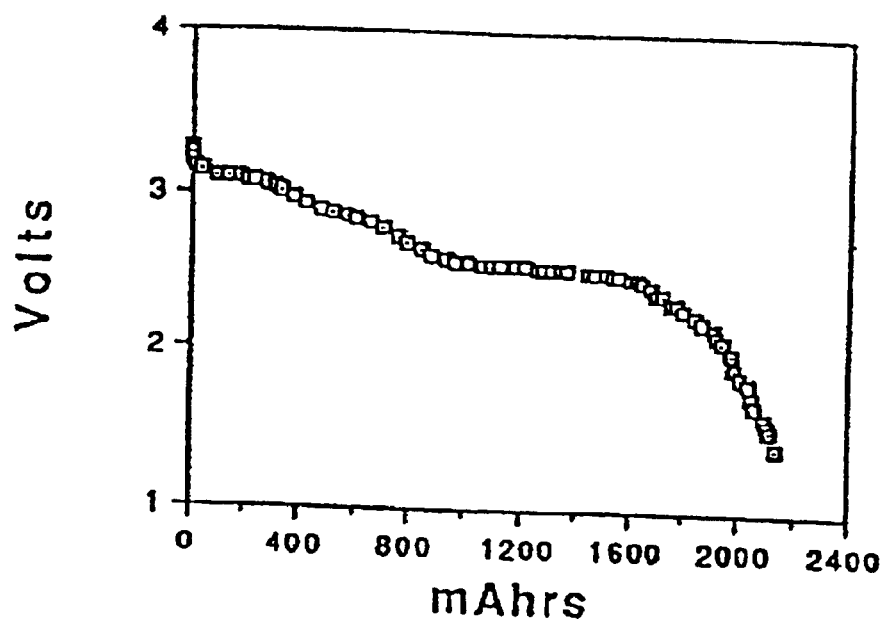
FIG. 1 is a graph showing discharge under a five kilohm load of a cell of the present invention which has not undergone autoclaving.

A battery suitable as a power source for an implantable medical device is comprised of a casing, cathode plates having as active material silver vanadium oxide (a metal oxide bronze), an anode having as active material lithium, a non-aqueous electrolyte solution which includes a lithium salt and an organic solvent, and a separator material encapsulating either or both of the electrodes, as discussed in greater detail in the aforesaid U.S. Pat. No. 4,830,940, which is assigned to the assignee of the present invention and the disclosure of which is hereby incorporated herein by reference. Other suitable active materials for the anode may be selected from groups IA and IIA of the Periodic Table. The cathode active material may suitably comprise other metal oxides, which are meant to include the metal oxide bronzes, and carbon monoflouride. Examples of metal oxides for the cathode material include, but are not limited to, manganese dioxide, vanadium oxide, and cobalt oxide. The reference herein and in the claims to lithium is meant to include alloys thereof.

The exposure of such a cell as described above to elevated temperatures during repeated periods of autoclaving requires that the cell be constructed so that it remains dimensionally and chemically stable. Thus, the cell suitably should retain dimensional and chemical stability during repeated exposures each of about one hour to a temperature of about 130 to 135 degrees C. For the purposes of this specification and the claims, the term "repeated" is meant to refer to at least five such exposures. The term "dimensionally stable" refers to the ability of the cell to resist swelling. As the temperature increases the pressure inside the cell increases. This may result in cell swelling if a cell includes an unsuitable electrolyte. The case walls undesirably bulge during such cell swelling due to high vapor pressure. The term "chemically stable" is meant to refer to maintenance of the chemical composition of the cell components so that performance of the cell is not significantly compromised by the autoclaving heat whereby it does not have reduced capacity or increased cell resistance or decreased cell life.

In order to minimize the generation of gas as the temperature is increased during autoclaving for dimensional stability, the electrolyte solvent is selected to have a high boiling point, i.e., at least about 100 degrees C. The solvent is also selected to have a high dielectric constant, i.e., at least about 5 so that the cell capacity may be maintained during the repeated exposures to an autoclaving environment. The electrolyte solvents are also selected to be thermally stable in the presence of the electrode active materials at the autoclaving temperature. Examples of solvents which are suitable for use with cells having lithium anodes and silver vanadium oxide cathodes include, but are not limited to, diglyme, sulfolane, propylene carbonate, ethylene carbonate, and mixtures thereof.

The salt and solvent combination should be such that high conductivity is provided, high thermal stability is present, and the cell can discharge effectively at room temperature and at 37 degrees C. By "thermal stability" is meant the ability of a material not to weaken or melt or degrade at the autoclaving temperature. This, includes the ability of the salt not to precipitate out of the electrolyte solution upon exposure to the autoclaving temperatures. Suitable lithium salts include, but are not limited to, lithium tetrafluoroborate, lithium trifluoromethane sulfonate, lithium hexafluoroarsenate, lithium hexafluorophosphate and lithium perchlorate.

The separator material is composed of an electrically insulative material to prevent an internal electrical short circuit between the electrodes, is chemically unreactive with the electrode materials, is both chemically unreactive with and insoluble in the electrolyte solution, and has a sufficient porosity to allow flow-through of the electrolyte solution during the electrochemical reaction in the cell. If the separator material were insufficiently wettable by the electrolyte solvent, there would be too high of resistance to flow of the electrolyte through the pores thereof due to the increased surface tension. In addition, melting or a tendency to melt of the separator material, if it has insufficient thermal stability, may tend to clog the openings therein to thereby undesirably prevent or reduce electrolyte flow. In order to have adequate thermal stability, the separator material is chosen to have a melting point of preferably at least about 130 degrees. Examples of suitable separator materials for the aforementioned electrolytes include, but are not limited to, polypropylene non-woven material, polypropylene membrane material, polypropylene laminate of non-woven and membrane material, a Teflon membrane material in conjunction with a polypropylene non-woven layer, and halogenated polymeric membranes such as Tefzel membranes provided by Scimat, Inc.

The active material of the anode, as well as that of the cathode, must also be thermally stable, i.e., have a melting point which is greater than about 150 degrees C., so that it can withstand the autoclaving temperatures without undesirably melting or degrading.

Repeated exposure to the elevated temperatures during autoclaving can aggravate corrosion problems. In order to prevent such corrosion, the various metallic cell components are suitably made of corrosion-resistant materials such as, for example, stainless steel or titanium. Glass seals providing feed-throughs for the electrodes are suitably composed of corrosion resistant glass. The cathode may suitably be enclosed in the separator material and then placed into the case containing the anode plates, which may also be enclosed in separator material, and the cell then vacuum filled with electrolyte after which a final close welding provides an hermetic seal of the case.

A preferred electrolyte for the cells of the present invention comprises lithium trifluoromethane sulfonate salt, having a good thermal stability, in a high conductivity solvent comprising a mixture of propylene carbonate and diglyme (2-methoxy ethyl ether), both having high boiling points and good thermal stability as well as the combination of solvents providing a higher conductivity than any of the aforementioned suitable solvents alone. While lithium trifluoromethane sulfonate is preferred, it should be understood that other suitable salts may be used with the mixture of propylene carbonate and diglyme. A suitable ratio, by volume, for the mixture of propylene carbonate and diglyme is 50:50.

A separator material composed of a laminate of a polypropylene membrane and a polypropylene mesh is not suitably wettable by propylene carbonate alone due to the low viscosity of propylene carbonate. However, the polypropylene laminate is sufficiently wettable by and may be used with the combination of propylene carbonate and diglyme, wherein the diglyme comprises at least about 10 percent by volume of the mixture, since the diglyme tends to thin the mixture.

Titanium reacts with carbon monofluoride at high temperatures to increase cell impedance. If the cathode active material is carbon monofluoride, the current collector therefor is suitably composed of superferrite or titanium coated with a carbon paint or other suitable conductor. In order to provide an electrolyte which has good stability when used with the carbon monofluoride cathode material, the electrolyte therefor is preferably selected to be lithium tetrafluoroborate or lithium trifluoromethane sulfonate in gammabutyrolactone solvent, which has a suitably high boiling point.

The following is an example of a cell made in accordance with the present invention and a comparison of its operating characteristics before and after repeated exposures thereof to an autoclaving environment, it being understood that the following example is being provided for illustrative purposes only and not for purposes of limitation.

Cells, that have a half-round shape of dimensions 7 mm×28 mm×43 mm, were constructed in accordance with the present invention. The cathode material comprised, by total weight-percent, 98% silver vanadium oxide (SVO), 1% Teflon 7A material, and 1% graphite. The anode material was composed of lithium, and the electrodes of the cells were prohibited from coming into contact with each other by using separators composed of Goretex polypropylene laminate material of a membrane and a non-woven mesh, a product of W. L. Gore & Assoc. The electrolyte used was comprised of 1M lithium trifluoromethane sulfonate as the salt component, and a 1:1 mixture of propylene carbonate:diglyme as the organic solvent component. The cell components were composed of corrosion-resistant materials, and the casing was hermetically sealed. The cells have a theoretical capacity of about 2.3 Ah with a volumetric energy density of about 870 Wh/L and a gravimetric density of about 260 Wh/kg.

Figure 2:
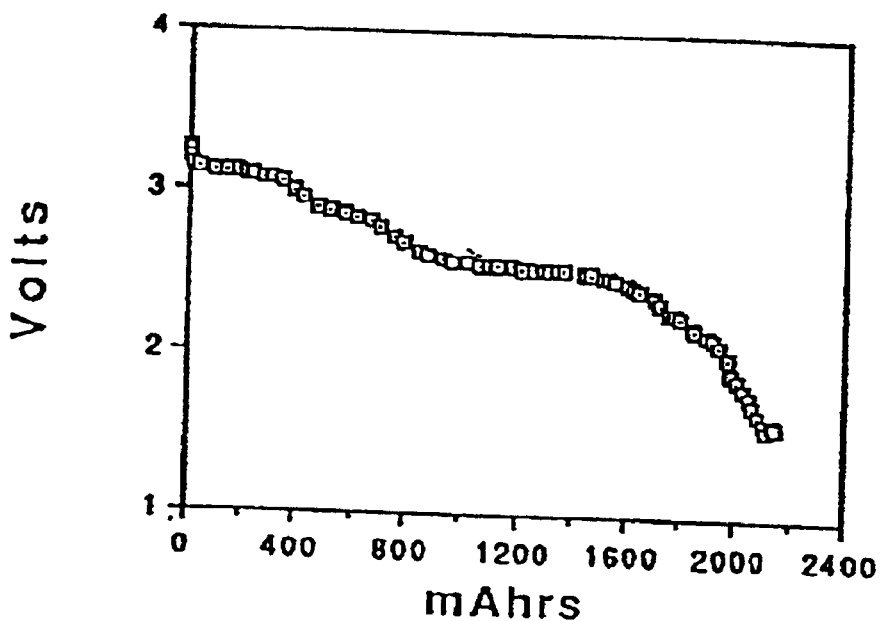
FIG. 2 is a graph showing discharge of the cell of FIG. 1 after it has been subjected to five exposures each of about one hour to an autoclaving environment at a temperature of about 130 degrees C.

The performance of the cells under 1 or 5 kilohm loads was observed. Cells that were subjected to five autoclave cycles, each cycle attaining a temperature to about 130 degrees C. for about one hour, were compared to identical cells which were not autoclaved. The comparison, as shown in Table I, indicates that there is no significant difference in delivered capacity between cells that were autoclaved and those that were not. Cells discharged under 1 kilohm delivered an average of 1.93 Ah or 84% of theoretical capacity to a 2 volt cutoff when they were autoclaved compared to 1.93 Ah or 84% when they were not. The 5 kilohm group delivered 2.06 Ah or 90% of theoretical capacity to a 2 volt cutoff when they were autoclaved and 2.07 Ah or 90% theoretical capacity when they were not autoclaved. Typical discharge curves of the autoclaved and non-autoclaved cells under 5 kilohm load are shown in FIGS. 1 and 2 respectively.

TABLE I

|  | Experimental to 2V (Ah) | % Theoretical 2V (Ah) |
|---|---|---|
| 1 kilohm Discharge |  |  |
| Autoclaved | 1.93 | 84 |
| Non-autoclaved | 1.93 | 84 |
| 5 kilohm Discharge |  |  |
| Autoclaved | 2.06 | 90 |
| Non-autoclaved | 2.07 | 90 |

The discharge behavior of the cells was also observed. The self-discharge of the cells was estimated from heat dissipated as measured by calorimetry. Microcalorimetry testing at 37 degrees C. was performed on cells stored at open circuit after 2, 5 and 8 months. At 2 months, the autoclaved cells showed annual self-discharge rates of 0.6% to 0.8% while the non-autoclaved cells showed rates of 1.2% to 1.3%. At 5 months there was still slightly less heat dissipation from the autoclaved cells than from non-autoclaved cells, but the difference was narrowed (avg. 0.55% vs. 0.67%) and after 8 months the averages were 0.28% vs. 0.43% for the average annual self-discharge. Thus, as presented in Table II, the microcalorimetry testing indicated less than 1% self-discharge per year for cells of this autoclavable design.

TABLE II

Microcalorimetry Test Results

| % Self-Discharge | 2 Months | 5 Months | 8 Months |
|---|---|---|---|
| Autoclaved | 0.72 | 0.55 | 0.28 |
| Non-autoclaved | 1.28 | 0.67 | 0.43 |

The above detailed description and examples are intended for purposes of illustrating the invention and are not to be construed as limiting. The invention can be embodied otherwise without departing from the principle thereof, and such other embodiments are meant to come within the scope of the present invention as defined by the appended claims.

What is claimed is:

1. In an electrochemical cell comprising a casing; an anode; a solid cathode having as active material a material selected from the group of materials consisting of metal oxide bronzes and carbon monofluoride; and an ionically conductive electrolyte solution, which is operatively associated with said anode and cathode, comprising a lithium salt and an organic solvent, wherein the improvement comprises a combination of components rendering the electrochemical cell autoclavable and dimensionally and chemically stable during repeated prolonged exposures to heat of from about 130° C., said combination comprising:

an anode having as active material a material which has a melting point greater than 150° C. and which is selected from groups IA and IIA of the Periodic Table; and a mixed electrolytic organic solvent having a boiling point greater than about 100° C. and a dielectric constant greater than about 5 selected from the group consisting of sulfolane, ethylene carbonate, propylene carbonate and gammabutyrolactone.

* * * * *

UNITED STATES PATENT AND TRADEMARK OFFICE
CERTIFICATE OF CORRECTION

PATENT NO. : 6,733,928 B2 Page 1 of 1
DATED : May 11, 2004
INVENTOR(S) : Takeuchi It is certified that error appears in the above-identified patent and that said Letters Patent is hereby corrected as shown below:

<u>Title page,</u>
Item [73], Assignee, delete "Greatbach" and insert -- Greatbatch --.

Signed and Sealed this

Twenty-first Day of March, 2006

JON W. DUDAS
*Director of the United States Patent and Trademark Office*